US009800592B2

(12) United States Patent
Jain et al.

(10) Patent No.: US 9,800,592 B2
(45) Date of Patent: Oct. 24, 2017

(54) DATA CENTER ARCHITECTURE THAT SUPPORTS ATTACK DETECTION AND MITIGATION

(71) Applicant: Microsoft Corporation, Redmond, WA (US)

(72) Inventors: Navendu Jain, Seattle, WA (US); Rui Miao, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/451,045

(22) Filed: Aug. 4, 2014

(65) Prior Publication Data

US 2016/0036838 A1    Feb. 4, 2016

(51) Int. Cl.
H04L 29/06       (2006.01)
H04L 12/911      (2013.01)
H04L 29/08       (2006.01)

(52) U.S. Cl.
CPC ........ H04L 63/1416 (2013.01); H04L 47/726 (2013.01); H04L 63/0236 (2013.01); H04L 67/10 (2013.01)

(58) Field of Classification Search
CPC . H04L 63/0227; H04L 63/1408; H04L 63/20; G06F 21/53
USPC .......................................................... 726/23
See application file for complete search history.

(56) References Cited

U.S. PATENT DOCUMENTS

| 7,716,729 | B2 | 5/2010 | Bhatia |
| 8,595,790 | B2 | 11/2013 | Chang et al. |
| 2002/0032774 | A1 | 3/2002 | Kohler et al. |
| 2003/0084327 | A1* | 5/2003 | Lingafelt ............ H04L 63/0209 726/23 |
| 2007/0192863 | A1* | 8/2007 | Kapoor ................... G06F 9/505 726/23 |
| 2008/0083029 | A1 | 4/2008 | Chiang et al. |
| 2009/0172815 | A1* | 7/2009 | Gu ........................ G06F 21/552 726/23 |
| 2011/0196961 | A1 | 8/2011 | Wang et al. |
| 2011/0214161 | A1* | 9/2011 | Stolfo ................... H04L 63/145 726/4 |
| 2014/0282526 | A1* | 9/2014 | Basavaiah ............... G06F 9/455 718/1 |

FOREIGN PATENT DOCUMENTS

WO     2013105991 A2    7/2013

OTHER PUBLICATIONS

Kourai, Kenichi, and Shigeru Chiba. "HyperSpector: virtual distributed monitoring environments for secure intrusion detection." Proceedings of the 1st ACM/USENIX international conference on Virtual execution environments. ACM, 2005.*

(Continued)

*Primary Examiner* — Syed Zaidi
(74) *Attorney, Agent, or Firm* — Medley, Behrens & Lewis, LLC

(57) ABSTRACT

Described herein are various technologies pertaining to identification of inbound and outbound network and application attacks with respect to a data center. Commodity servers are used to monitor ingress and egress traffic flows, and anomalies are detected in the traffic flows. Responsive to detecting an anomaly, a mitigation strategy is executed to mitigate damage caused by a cyber-attack.

20 Claims, 9 Drawing Sheets

(56) References Cited

OTHER PUBLICATIONS

Heorhiadi, et al., "Balancing Computation-Communication Tradeoffs in Scaling Network-Wide Intrusion Detection Systems ", In the Technical Report, Retrieved on: Jan. 7, 2014, 16 pages.

Kim, Seong Soo, "Real-Time Analysis of Aggregate Network Traffic for Anomaly Detection ", In Dissertation for the Degree of Doctor of Philosophy, May, 2005,167 pages.

Kim, et al., "Detecting Traffic Anomalies through Aggregate Analysis of Packet Header Data", In Proceeding of Networking, May, 2004, 13 pages.

Altaher, et al., "Real Time Network Anomaly Detection Using Relative Entropy", In Proceeding of the High Capacity Optical Networks and Enabling Technologies, Dec. 19, 2011, 3 pages.

Liu, et al., "Sketch-Based Network-Wide Traffic Anomaly Detection ", In Technical Report ECPE Department, Apr. 2009, 24 pages.

Chao, et al., "Abnormal Event Detection for Network Flooding Attacks", In the Journal of Information Science and Engineering, vol. 20, Issue 6, Nov. 2004, 13 pages.

"Written Opinion of the International Preliminary Examining Authority Issued in PCT Application No. PCT/US2015/043513", Mailed Date: Mar. 18, 2016, 5 Pages.

"International Search Report & Written Opinion Issued in PCT Application No. PCT/US2015/043513", Mailed Date: Oct. 15, 2015, 13 Pages.

Shieh, et al., "Sharing the Data Center Network", In Proceedings of the 8th USENIX Conference on Networked Systems Design and Implementation, Mar. 7, 2011, 14 Pages.

"Response to the International Search Report & Written Opinion Issued in PCT Application No. PCT/US2015/043513", Filed Date: Feb. 2, 2016, 14 Pages.

"International Preliminary Report on Patentability Issued in PCT Application No. PCT/US2015/043513", Mailed Date: Jun. 14, 2016, 9 Pages.

"Response to the Office Action Issued in European Patent Application No. 15750547.0", Filed Date: Aug. 3, 2017, 16 Pages.

* cited by examiner

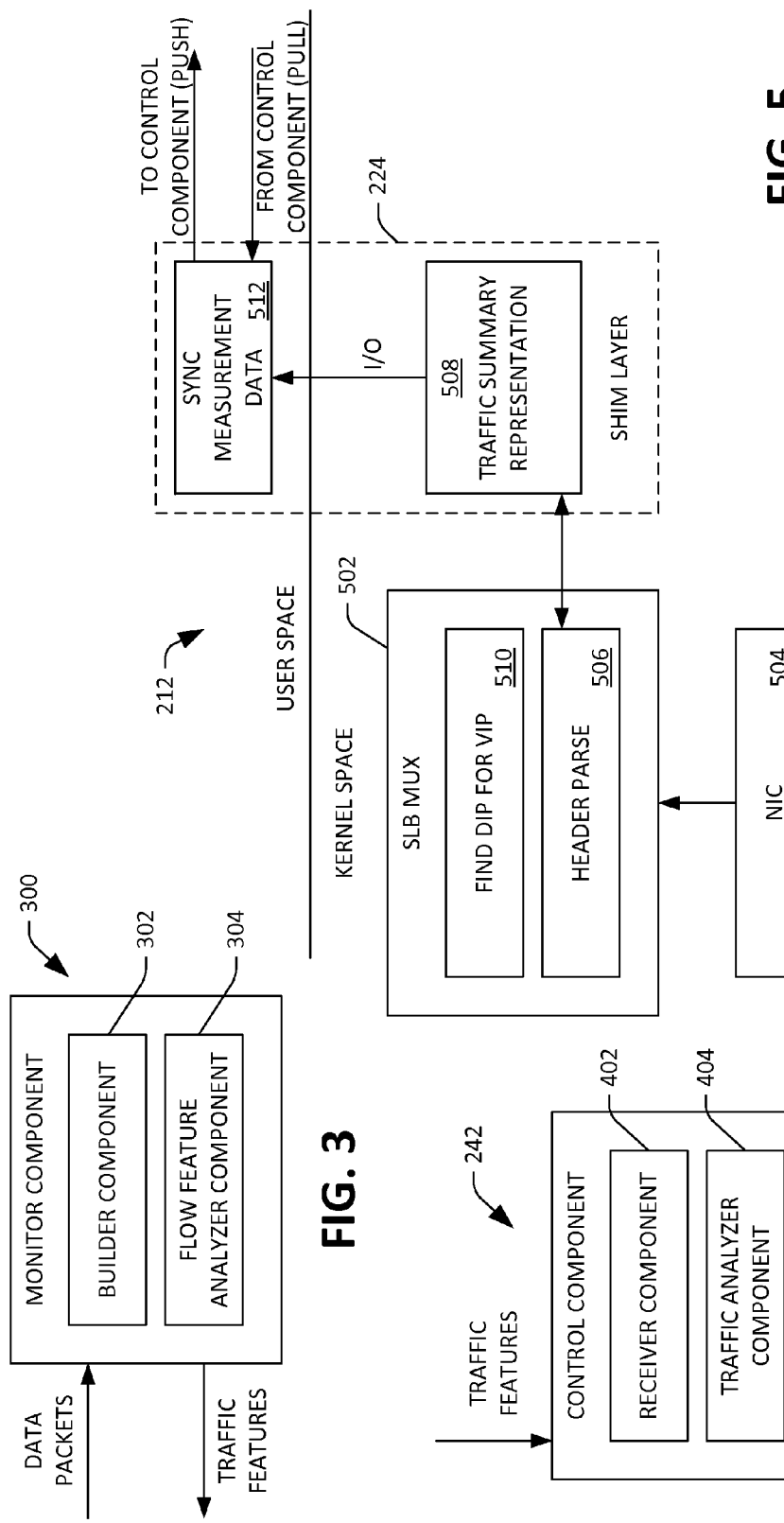

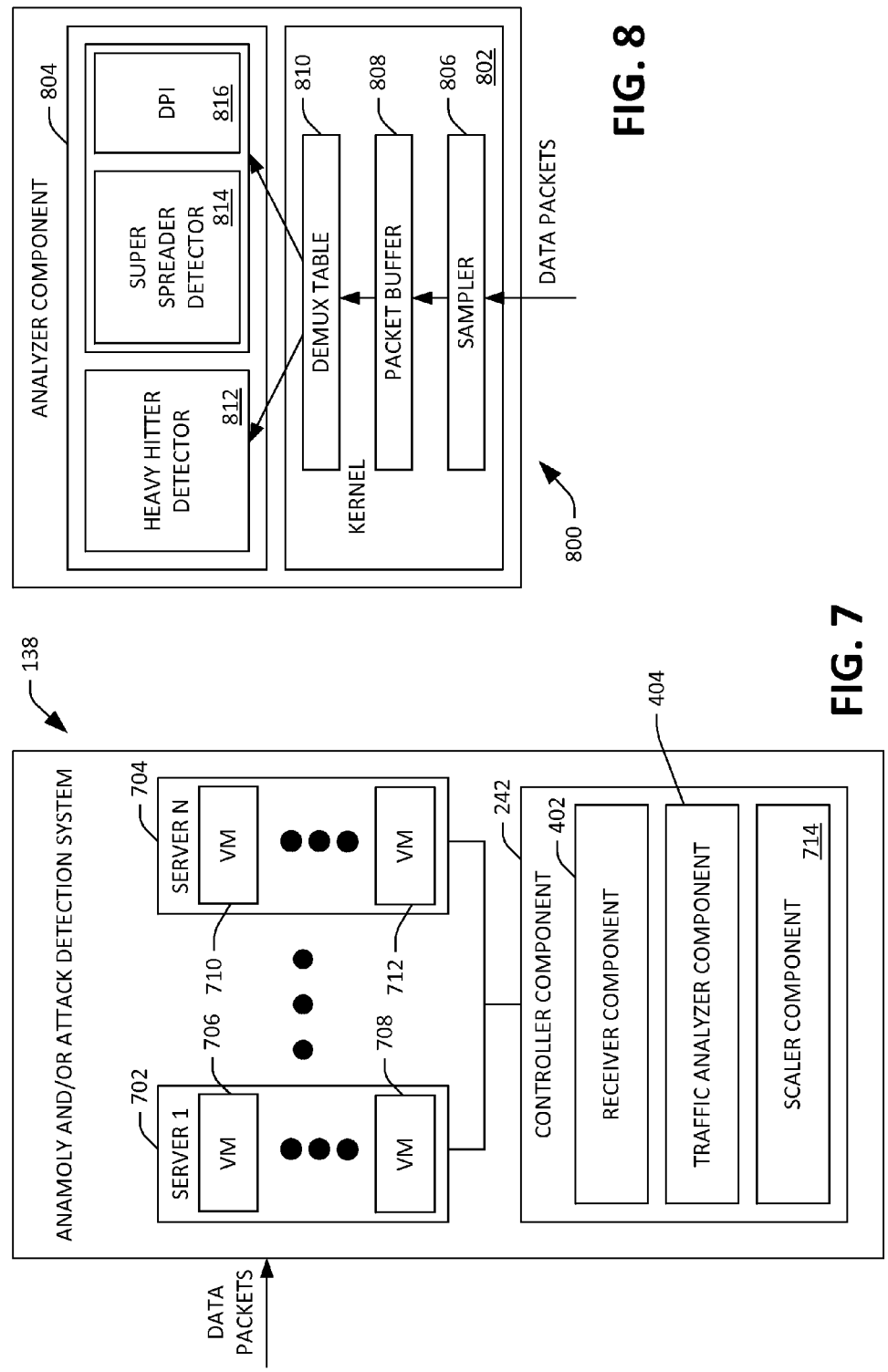

DATA CENTER ARCHITECTURE THAT SUPPORTS ATTACK DETECTION AND MITIGATION

BACKGROUND

Cloud services are growing rapidly—the market for cloud services is expected to reach several hundred billion dollars in the relatively near future. Cloud services are hosted on a data center or group of data centers, wherein a data center includes numerous computing devices and network infrastructure devices that support compute, networking and storage services. Devices in data centers, and services hosted in those devices, however, are unfortunately increasingly becoming a target for cyber-attacks. Data centers have become targets of cyber-attackers for at least two reasons: 1) a data center or network of data centers may host thousands to tens of thousands of different services, so attacking a data center can cause significant and sometimes spectacular collateral damage; 2) attackers can utilize compromised devices in a data center to launch outbound attacks, in addition to hosting malware, stealing confidential data, disrupting a competitors service, and selling compromised virtual machines (VMs) in an underground economy. In particular, attackers have been known to use VMs executing in data center devices to deploy bot nets, exploit kits, to detect vulnerabilities, send spam, launch Denial of Service (DoS) attacks to other sites, etc.

Conventionally, a variety of approaches have been employed to detect attacks on infrastructure of data centers. For example, to detect incoming attacks, data center operators have adopted a defense-in-depth approach by deploying, 1) commercial hardware devices (e.g., firewalls, Intrusion Detection Systems (IDS), distributed DoS (DDoS) protection appliances, etc.) at the network level; and 2) proprietary software (e.g., host-based IDS, anti-malware) at the host level. The above-mentioned hardware devices analyze inbound traffic to protect against a variety of attacks, such as Transmission Control Protocol (TCP) SYN flood attacks, TCP null attacks, User Datagram Protocol (UDP) flood attacks, and UDP fragment misuse. To block unwanted traffic, data center operators utilize a combination of mitigation mechanisms, such as Access Control Lists (ACLs), blacklists and whitelists, rate limiters, and/or traffic redirection to scrubbers for deep packet inspection (DPI) (e.g. malware detection). Other hardware devices, such as load balancers, aid detection by dropping traffic destined to blocked ports and IP addresses. To protect against application-level attacks, tenants (e.g., computer-executable applications hosted by host servers or VMs in the data center) typically install end host-based solutions for attack detection on their respective VMs. These software solutions periodically download the latest threat signatures and scan applications executing in the VMs for compromises. Diagnostic information, such as logs and anti-malware events are also typically logged for post-mortem analysis.

To prevent outbound attacks, the hypervisor layer in the host servers is configured to prevent spoofing of a source address (e.g., a source Internet Protocol (IP) address) in outbound traffic, and is further typically configured to cap outbound bandwidth per VM instantiated in the host servers. Similarly, access control rules can be set up to rate limit or block ports that VMs are not supposed to use. Finally, (relatively expensive) hardware devices can be configured to mitigate outbound anomalies, similar to prevention of inbound anomalies described above.

While many of these approaches are relevant to data center defense (such as end host filtering and hypervisor controls), the hardware devices are inadequate for deployment at the Cloud scale (e.g., over a data center or multiple data centers in communication with one another) for at least three reasons. First, the above-referenced hardware devices introduce unfavorable cost versus capacity trade-offs. In particular, these hardware devices can cost anywhere between hundreds of thousands to millions of dollars per device, but the amount of data that can be handled per hardware device is relatively limited. These hardware devices have been found to fail under both network layer and application layer DDoS attacks. Accordingly, to handle traffic volume flowing through and across data centers, and to handle increasingly high-volume DoS attacks, utilization of the hardware devices described above would incur significant costs. Further, these devices must be deployed in a redundant manner, further increasing procurement and operational costs.

Second, the hardware devices are relatively inflexible. This is because the devices run proprietary software, thereby limiting how operators can configure them to handle the increasing diversity of cyber-attacks. Given a lack of rich programming interfaces, operators are forced to specify and manage a large number of policies themselves for controlling traffic (e.g., set thresholds for different protocols, ports, cluster virtual IP addresses (VIPs) at different time granularities, etc.) Also, the hardware devices have limited effectiveness against increasingly sophisticated attacks, such as zero-day attacks. Finally, the hardware devices may not be kept up-to-date with operating system (OS) firmware and builds, which risks reducing their effectiveness against attacks.

Third, collateral damage may be associated with such hardware devices. Since many attacks can ramp up in tens of seconds to a few minutes, a latency in detecting an anomaly or attack risks overloading target VMs, as well as the infrastructure of data centers (e.g., firewalls, load balancers and core links), which may cause collateral damage to co-hosted tenants. Still further, if the hardware devices are unable to quickly identify when an attack has subsided, legitimate traffic may be mistakenly blocked. Accordingly, given that many security solutions apply traffic profiling and smoothing techniques to reduce false positives for attack detection, such solutions may not be able to act fast enough to avoid collateral damage.

SUMMARY

The following is a brief summary of subject matter that is described in greater detail herein. This summary is not intended to be limiting as to the scope of the claims.

Described herein is a system that is configured to detect attacks with respect to a data center. The system comprises at least one processor and at least one memory, wherein the memory comprises an attack detection system that is executed by the at least one processor. The attack detection system comprises a control component, wherein the control component comprises a receiver component that receives traffic flow data, the traffic flow data indicative of a feature of traffic transmitted between 1) a first computing device in the data center or a first service hosted by the data center, and a 2) second computing device or a second service over a window of time. The control component further comprises a traffic analyzer component that identifies either an inbound attack or an outbound attack based upon the traffic flow data. The inbound attack is an attack on the first computing device or first service from the second computing device or the second service, the outbound attack is an attack on the second computing device or second service from the first computing device or first service.

BRIEF DESCRIPTION OF THE DRAWINGS

FIG. 3 is a functional block diagram of an exemplary component that is configured to generate respective traffic summaries of traffic flows.

FIG. 4 is a functional block diagram of an exemplary component that facilitates aggregating traffic flow summaries and identifying an inbound or outbound attack based upon the aggregated traffic flow summaries.

FIG. 5 is a functional block diagram that depicts operation of a portion of the shim layer in a data center.

FIG. 7 is a functional block diagram of an exemplary anomaly and/or attack detection system.

FIG. 8 is a functional block diagram of an exemplary component that facilitates identifying inbound and outbound attacks on the data center at the VM/host level.

DETAILED DESCRIPTION

Figure 1:
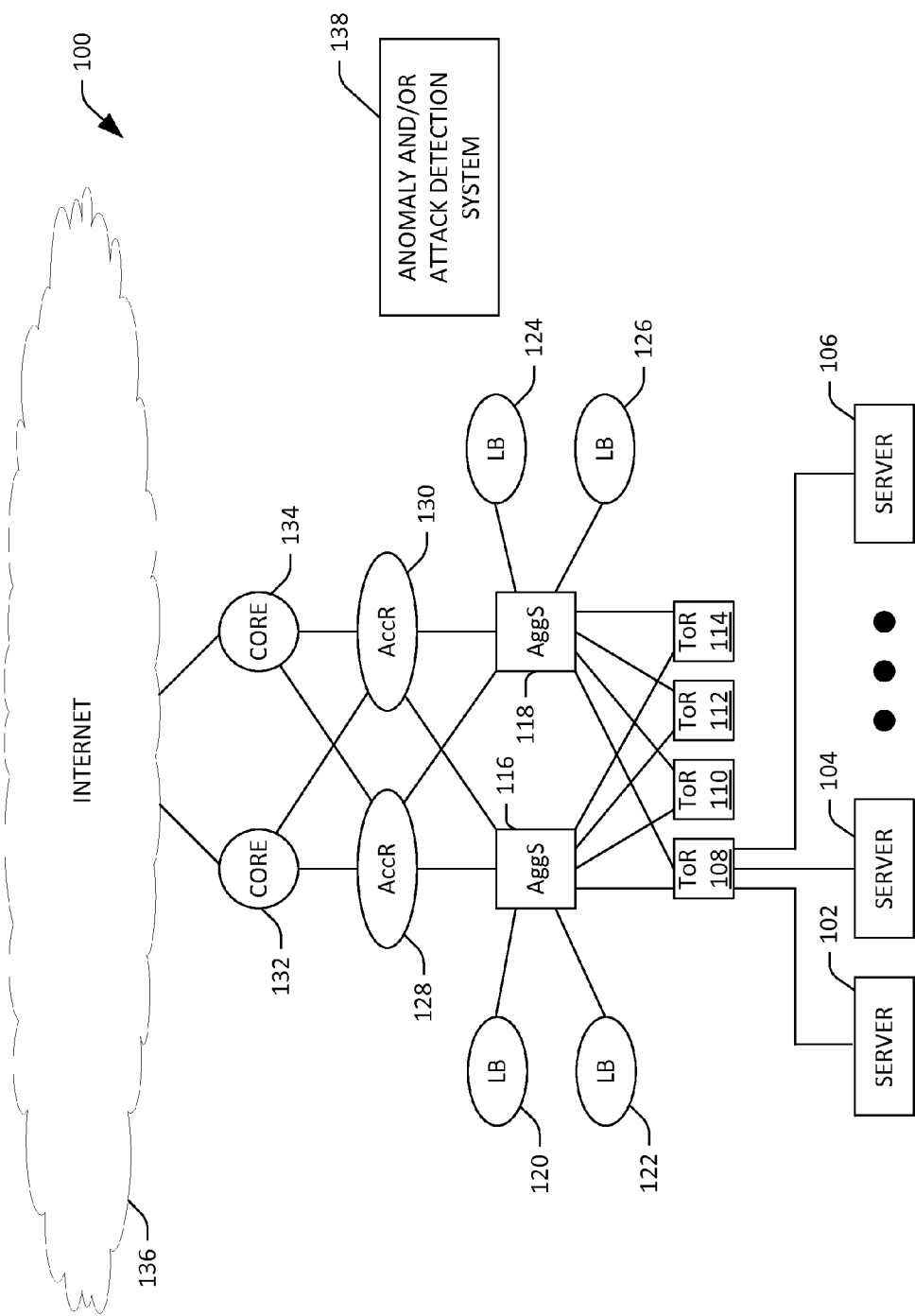
FIG. 1 illustrates an exemplary data center architecture.

Various technologies pertaining to detecting anomalies and/or attacks in a data center are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various data center architectures that can be employed to detect and mitigate both inbound and outbound attacks on infrastructure or services hosted by a data center or data centers. As will be described herein, an anomaly and/or attack detection system (referred to herein as an attack detection system) can be at least partially implemented in a data center through use of commodity servers. The commodity servers, generally, are configured to generate summaries of inbound and outbound traffic flows through at least one data center. A traffic flow is a sequence of data packets transmitted from a source address to a target address, wherein the source address and/or the target address can be an Internet Protocol (IP) address, a virtual IP address (VIP) address, etc. In an example, a traffic flow can be identified as a five-tuple: [source IP address, source port, protocol, destination IP address, destination port]. An inbound traffic flow is a traffic flow directed to a device/host in the data center or a service hosted by the data center (e.g., the target address is representative of a device in the data center or the service hosted by the data center). An outbound traffic flow is a traffic flow directed from a device in the data center or a service hosted by the data center to a computing device that is external to the data center (e.g., the target address is representative of the computing device external to the data center).

In a first exemplary embodiment, the attack detection system can be at least partially incorporated into the data center architecture as a distributed "shim" layer that is positioned in the flow of traffic travelling through the data center (e.g., positioned "in-band"). In such an embodiment, the shim layer has access to data packets in respective traffic flows through the data center as such traffic flows travel through the data center. For example, a plurality of commodity servers can be configured to act as respective software load balancers (SLBs). In another example, the shim layer can be instantiated as an add-on to pre-existing functionality—for instance, the shim layer can be instantiated as an add on to existing SLBs. In addition, the commodity servers can further be configured to generate respective summaries of traffic flows that are processed by the SLBs. In a non-limiting example, functionality of the shim layer can be distributed over virtual machines (VMs) instantiated in the commodity servers.

The traffic summaries generated by the shim layer can be indicative of various features of inbound and outbound traffic flows. These traffic summaries can be transmitted to a centralized system, such that traffic summaries from multiple commodity servers are received. The centralized system can aggregate traffic summaries received from the shim layer and can detect both inbound and outbound attacks based upon the aggregated traffic summaries. For example, the centralized system can analyze aggregated traffic flow summaries over multiple time granularities (e.g., thirty seconds, one minute, five minutes, ten minutes). Additionally, when an attack (e.g., either in inbound or outbound attack) is identified by the centralized system, the centralized system can cause at least one mitigation strategy to be deployed to mitigate the attack. Exemplary mitigation strategies include blocking traffic from an IP address that has been identified as being a source of an inbound attack, blocking traffic from a host server in the data center that is believed to originate an outbound attack, blocking access of host VMs to particular ports, etc.

In another exemplary architecture, the attack detection system can be perceived as a subsystem that is orthogonal to the flow of traffic through the data center (e.g., the attack detection system is placed entirely "out-of-band"). In such an exemplary architecture, at one or more points in the data center architecture, traffic flows can be multiplexed such that the attack detection system has access to respective copies of the traffic flows passing through the data center e.g., using the port mirroring functionality to send a copy of the traffic from switches/routers to the out-of-band attack detection system. In such an architecture, the attack detection system can be implemented using commodity servers that are configured to identify inbound and outbound attacks. For example, a commodity server can be configured to receive data packets in respective traffic flows. The commodity server can include at least one VM instantiated thereon, wherein an application executing in the VM (e.g., a detection application) is configured to sample data in the traffic flows at a configurable sample rate. For example, the detection application can be configured to detect particular events (e.g., over multiple time granularities), such as TCP SYN/UDP floods, DNS reflection, etc.

With more particularity, a VM can be instantiated on a commodity server, and the detector application can be instantiated in the VM. A sampling application can also be instantiated in the VM, and the sampling rate can be configured for the sampling application. The detector application can also be provided with a callback Uniform Resource Identifier (URI). When the detector application detects an ongoing attack, the detector application can invoke a callback to the callback URI. In an exemplary embodiment, the callback can specify a mitigation strategy in a manner defined by the hosted service that is subject to attack. For instance, the callback can set up rules for access control, rate limit a traffic flow, or redirect anomalous traffic to scrubber devices for an in-depth analysis. In such an architecture, computing resources allocated to attack detection can be scaled based upon traffic flow volume being analyzed. For instance, additional VMs (i.e., scale-out) can be instantiated as traffic volume increases, and VMs can be placed on standby or decommissioned (i.e., scale-in) when traffic volume decreases. Likewise, computing resources allocated to a VM can increase (i.e., scale-up) as traffic volume analyzed by the VM increases, and computing resources allocated to the VM can decrease (i.e., scale-down) as traffic volume analyzed by the VM decreases.

With reference now to FIG. 1, an exemplary (partial) data center architecture 100 is illustrated. It is to be understood that the data center architecture 100 is exemplary and that other topology variants, such as flat networks and/or Clos topologies are contemplated and are intended to fall under the scope of the hereto-appended claims. The data center architecture 100 includes a plurality of rack-mounted servers 102-106. The rack-mounted servers 102-106 can host applications for customers of the data center, wherein such applications can include video streaming applications, database processing applications, audio streaming applications, amongst others.

The data center architecture 100 further comprises a plurality of top of rack (ToR) switches 108-114. A respective plurality of rack-mounted servers can be connected (or dual/multi-homed) to each ToR switch in the ToR switches 108-114. For example, as shown, the plurality of rack-mounted servers 102-106 is connected to the ToR switch 108. The architecture 100 also includes a primary aggregation switch 116 and a backup aggregation switch 118, wherein each ToR switch in the ToR switches 108-114 is connected to the primary aggregation switch 116 and the backup aggregation switch 118 (for redundancy). In practice, a data center includes several pairs of primary and backup aggregation switches, and each redundant pair of aggregation switches aggregates traffic from several (e.g. tens) of ToR switches. The architecture 100 may include a first redundant pair of load balancers (LB) 120-122 connected to the primary aggregation switch 116 and a second redundant pair of load balancers 124-126 connected to the backup aggregation switch 118. The load balancers 120-126 can perform mapping between static Internet Protocol (IP) addresses (e.g. exposed to clients through the Domain Name System (DNS)) and dynamic IP addresses of the rack-mounted servers 102-106 that process user requests.

The architecture 100 further includes a primary access router 128 and a backup access router 130. The primary aggregation switch 116, the backup aggregation switch 118, the primary access router 128, and the backup access router 130 can form a redundancy group. In a data center having the architecture 100, redundant groups of devices and links can be used to mask network failures. The aggregation switches 116-118 forward traffic (aggregated from the ToR switches 108-114) to the access routers 128-130. The architecture 100 also includes a primary core router 132 and a backup core router 134, each of which are connected to both access routers 128 and 130. The primary access router 128, the backup access router 130, the primary core router 132, and the backup core router 134 form another redundancy group. The access routers 128-130 route, for example, aggregated traffic from up to several thousand rack-mounted servers (e.g., the rack mounted servers 102-106) and route the traffic to the core routers 132-134. The core routers 132 and 134 connect to the remainder of the data center network (e.g., other data centers) and the Internet 136.

In an exemplary embodiment, the plurality of servers 102-106 can be partitioned into virtual local area networks (VLANs) to limit overhead and to isolate different applications hosted in the data center network. At each layer of the data center topology (with the possible exception of a subset of ToR switches 108-114), redundancy (e.g., one-to-one redundancy) can be built into the network topology to mitigate failures. Further, in addition to routers and switches, the architecture 100 can include other network devices, such as IDSes, DDoS protection appliances, firewalls, etc.

As will be described in greater detail herein, the data center architecture 100 also includes an anomaly and/or attack detection system 138 (referred to herein as the attack detection system 138), which is configured to detect attacks (inbound and/or outbound) in traffic flows travelling through the data center. A traffic flow refers to a sequence of data packets that share a source address and a target address, wherein the source address represents a computing device or service that generates the data packets and the target address represents a computing device or service that is to receive the data packets. In an example, a traffic flow can be identified as a five-tuple: [source IP address, source port, protocol, destination IP address, destination port]. An outbound attack refers to an attack in a traffic flow that is to be output by the data center to a computing device that is external to the data center (e.g., the source address represents a computing device in the data center or a service hosted by computing devices in the data center). An inbound attack refers to an attack in a traffic flow that is received by the data center (e.g., directed to a computing device in the data center or a service hosted by the data center). In an example, an inbound attack can be from a computing device that is external to the data center. In another example, an inbound attack can be from another computing device or service that is within the data center. Thus, the attack detection system 138 can identify intra-data center attacks (e.g., an attack initiated by a first computing device or first service in the data center and directed towards a second computing device or second service in the data center).

The attack detection system 138 can be implemented using commodity servers, while facilitating near real-time attack and/or anomaly detection. The attack detection system 138 is shown in FIG. 1 as being disembodied from other portions of the data center architecture 100—the attack detection system 138 is depicted in this manner, because a variety of different data center architectures that include the attack detection system 138 are contemplated. For example, in an exemplary embodiment, the attack detection system 138 can be at least partially implemented as a distributed "shim" layer that is placed in the flow of traffic (e.g., "in-band"), wherein the distributed shim layer is configured to generate summaries of traffic flows through the data center. In another example, the attack detection system 138 can at least partially be implemented as a subsystem in the data center, wherein traffic flows are multiplexed at one or more points in the data center and provided to the attack detection system 138. In either of such implementations, the attack detection system 138 can detect both inbound and outbound cyber-attacks on the data center. Tables 1, 2, and 3 shown below illustrate exemplary types of attacks that can be detected by the attack detection system 138. Specifically, Table 1 depicts exemplary attack types and patterns corresponding to the attack types, Table 2 depicts the exemplary attack types and corresponding notes, relevant features, and rules for detecting and/or mitigating the attacks, and Table 3 depicts exemplary classifications of network-based attacks. Exemplary attack types referenced in these tables include, but are not limited to, DoS attacks, flow rate attacks, port scan attacks, network scan attacks, brute force attacks, spam, User Datagram Protocol (UDP) floods, Internet Control Message Protocol (ICMP) floods, etc.

TABLE 1

| Attack Type | Pattern | | | | |
|---|---|---|---|---|---|
| | Srcip | Src port | Dst ip | Dst port | Prot. |
| DOS (High Fan-in) | Many | * | One/Many | One/Many | TCP/UDP/ICMP |
| DOS (Point to Point) | Fixed | Many | One/Many | Many (HTTP: 80) | TCP/UDP/ICMP |
| Low Rate Attack | Fixed | Many | Many | Several (HTTP: 80; HTTPS: 443) | TCP |
| Port Scan | Fixed | * | Many | Many | TCP/UDP/ICMP |
| Network Scan | Fixed | * | Many | Several (MSSQL: 1433) | TCP/UDP |
| Brute Force (Broadcast) | Fixed | Many | Many | Fixed (RDP: 3389; SSH: 22; VNC: 3900) | TCP |
| Brute Force (Point to Point) | Fixed | Many | One/Many | Fixed (RDP: 3389; SSH: 22; VNC: 3900) | TCP |
| SPAM/Worms | Fixed | * | Many | Fixed (SMTP: 25) | TCP |
| Null Scan | * | * | Fixed | * | TCP |
| SYN flood | Many | * | Many | Many | TCP |
| RST anomaly | Fixed | * | Many | * | TCP |
| FIN flood | Many | * | Many | Many | TCP |
| Xmas flood | Many | * | Many | Many | TCP |
| DNS redirection | Many | Fixed DNS 53 | Many | Fixed (DNS 53) | UDP |
| Other protocol Anomalies | Many | * | Many | * | Others |
| Phishing site | * | * | * | * | * |

TABLE 2

| Attack Type | Note | Feature in time series | Rule |
|---|---|---|---|
| DOS (High Fan-in) | Spoofed source | #pkts, #bytes | SELECT TOP-K BYTES, PKTS Where #srcIP > THRESH GROUP BY destination address/subnet |
| DOS (Point to Point) | Point to point flooding | #pkts, #bytes | SELECT TOP-K BYTES, PKTS Where #srcport > THRESH GROUP BY source address, destination address/subnet |
| Low Rate Attack | Vanilla TCP connection | High #conn point-to-point for a long duration | SELECT TOP-K #conn, duration Where dstport = 80 or 443 GROUP BY source address, destination address |
| Port Scan | Exploit Open ports | #conn for a long duration | SELECT TOP-K #dstport |

TABLE 2-continued

| Attack Type | Note | Feature in time series | Rule |
|---|---|---|---|
| Network Scan | Exploit vulnerability | #conn for a long duration | GROUP BY source address SELECT TOP-K #dst address/subnet |
| Brute Force (Broadcast) | Special case of network scan (password guess) | #conn for a long duration | GROUP BY source address, destination port SELECT TOP-K #src port, #dst address/subnet WHERE destination port = 3389 or 22 or 3900 |
| Brute Force (Point to Point) | Password Scan | #conn for a long duration | GROUP BY source address, destination port SELECT TOP-K #src port WHERE destination port = 3389 or 22 or 3900 |
| SPAM/Worms | Special case of network scan | #conn for a long duration | GROUP BY source address, dst addr, dst port SELECT TOP-K #dst address/subnet GROUP BY source address, destination port |
| Null Scan | Tcpflag = 0 | #pkts, #bytes | SELECT TOP-K BYTES, PKTS Where Tcpflag = 0 GROUP BY destination address/subnet |
| SYN flood | Tcpflag = 2 | #pkts, #bytes | SELECT TOP-K BYTES, PKTS Where Tcpflag = 2 GROUP BY destination address/subnet |
| RST anomaly | Responding unexpected connections, Tcpflag = 4 | #pkts, #bytes | SELECT TOP-K BYTES, PKTS Where TCPflag = 4 GROUP BY destination address/subnet |
| FIN flood | Tcpflag = 1 | #pkts, #bytes | SELECT TOP-K BYTES, PKTS Where Tcpflag = 1 GROUP BY destination address/subnet |
| Xmas flood | Tcpflag = 29 (FIN|URG|PSH) | #pkts, #bytes | SELECT TOP-K BYTES, PKTS Where Tcpflag = 0x29 GROUP BY destination address/subnet |
| DNS redirection | Unsolicited DNS response | #pkts, #bytes | SELECT TOP-K PKTS Where #srcIP > THRESH Where srcport = 53 GROUP BY destination address/subnet |
| Other protocol Anomalies | Unexpected heavy hitters, inbound only | #pkts, #bytes | SELECT TOP-K PKTS Where #srcIP > THRESH GROUP BY destination address |
| Phishing site | Dark web, malicious traffic | TDS IP Blacklist | ACL Filtering based on blacklisted src IP or dst IP |

TABLE 3

| Attacks | Desc. | Net/App | Target | Network features | Detection Method |
|---|---|---|---|---|---|
| UDP flood | Send many UDP, ICMP, TCP SYN pkts to random or fixed ports on a server | Net | Network bankwidth | #pkts/min | Volume-based |
| ICMP flood | | Net | Server resources | #pkts/min | Volume-based |
| TCP SYN flood | | Net | Server resources | #pkts/min | Volume-based |
| Port scan (NULL, Xmas) Port scan (RST, FIN, UDP | Detect open ports of the target machine by sending pkts with different ports | Net | Server vulnerability | TCP flags #pkts/min | Signature-based Volume-based |
| Brute-force attacks | Scan the password or admin. control (using RDP, SSH, VNC) | App | Server vulnerability | Fan-in/out ratio #pkts/min, #conn/min | Spread-based, Volume-based |
| DNS reflection | Broadcast DNS lookups to multiple DNS servers with spoofed source IPs | App | Server resources | Fan-in/out ratio #pkts/min | Spread-based, Volume-based |
| SQL vulns. | Scan over SQL ports with malware payload to exploit the vulnerability | App | SQL server vulnerability | #conn/min | Spread-based |
| TDS | Comm. with hosts on malicious web infras. | Net | Users | Src IP/dst IP | Comm. pattern-based |
| Spam | Launch email spam to multiple SMTP server | App | Users | Fan-in/out ratio | Spread-based |
| Security proto, anomalies | Unusual SPS, IPTM, IPv4 Encap traffic | App | Protocol vulns. | 3 pkts/min | Volume-based |

In operation, the attack detection system 138 receives data packets of respective traffic flows and analyzes these data packets to identify particular types of attacks pertaining to the data center (both inbound and outbound attacks). With more particularity, the attack detection system 138 can receive data packets in both ingress traffic flows and egress traffic flows, and can thus detect both inbound and outbound attacks. As indicated above, the attack detection system 138 can be employed in numerous network topology structures. For instance, the attack detection system 138 can be incorporated into a compute container as a small-scale data center, which does not include core routers therein. Various exemplary data center architectures illustrating different manners in which the attack detection system 138 can be implemented are now set forth.

Figure 2:
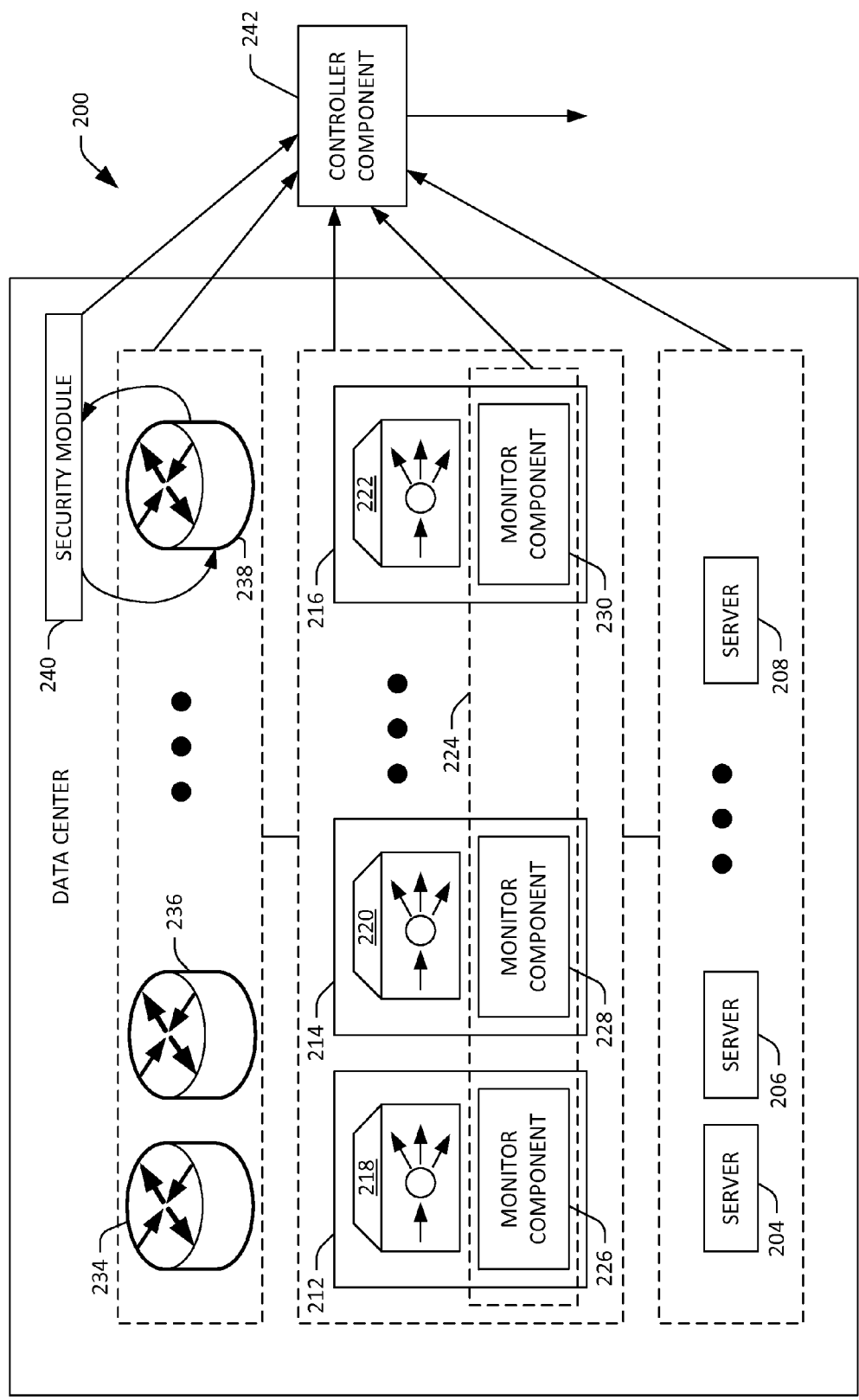
FIG. 2 is a functional block diagram that illustrates an exemplary data center architecture, where a distributed "shim" layer facilitates identifying inbound and outbound data center attacks.

Now referring to FIG. 2, an exemplary data center 200 is presented. The architecture of the data center 200 includes a plurality of server computing devices (rack-mounted servers) 204-208, which may also be referred to as end hosts. The server computing devices 204-208, for example, can include the rack-mounted servers 102-106 shown in FIG. 1. The server computing devices 204-208 host tenants, wherein a tenant refers to a computer-executable application that utilizes resources of at least one of the servers to 204-208 to provide a service to a client of the data center and/or an end user. Such service typically includes compute and/or storage services.

The data center 200 further includes a second plurality of server computing devices 212-216, wherein the second plurality of server computing devices 212-216 can be commodity servers. In the exemplary data center 200, the second plurality of server computing devices 212-216 are configured with respective software load balancers (SLBs) 218-222. The SLBs 218-222, as indicated above, can perform static (IP) address-dynamic IP address mapping, thus distributing the workload of the server computing devices 204-208.

The data center 200 also includes a distributed shim layer 224 that is configured to monitor traffic flowing through the data center. The shim layer 224 includes a plurality of monitor components 226-230 that execute respectively on the plurality of servers 212-216. It can therefore be ascertained that the shim layer 224 can have access to data packets that are received by the SLBs 218-222, and is thus positioned in the flow path of each ingress and egress data packet. While the shim layer 224 is shown as being distributed over commodity servers that co-host SLBs, it is to be understood that the shim layer 224 can be positioned at other locations in the data center 200. For instance, the shim layer 224 can be incorporated into ToR switches, aggregation switches, routers, etc. Operation of the shim layer 224 will be described in greater detail herein.

The data center 200 further includes a plurality of core routers 234-238. For example, the core routers 234-238 can include the core routers 132 and 134 referred to in FIG. 1. A security module 240 can optionally be included in the data center 200, wherein the security module 240 is configured to monitor traffic flowing through the core router 238, for example. The security module 240 can be a third party security system. In an exemplary embodiment, the security module 240 can be a third party hardware device that is configured to monitor traffic flows for particular types of anomalies.

A controller component 242 can be in communication with the shim layer 224, such that the controller component 242 receives data output by the instances of the monitor component 226-230 executing on the second plurality of servers 212-216, respectively. The controller component 242 can optionally receive data indicative of traffic flow features from other devices/applications in the data center 200. For example, the controller component 242 can receive traffic analysis data from applications hosted on the first plurality of servers 204-208 (e.g., where the applications are configured with customer-defined traffic analysis programs). The controller component 242 can also receive traffic flow summaries from the shim layer 224, where the traffic flow summaries will be described in greater detail below. Still further, the controller component 242 can receive traffic analysis data generated by the SLBs 218-222. In addition, the controller component 242 can receive network flow data from the core routers 234-238. Finally, the controller component 242 can receive data indicative of incidents detected by the security module 240.

Based upon at least the data received from the shim layer 224 (and optionally data received from other devices/applications in the data center 200), the controller component 242 can identify inbound and/or outbound cyber-attacks. Furthermore, the controller component 242, responsive to identifying an inbound and/or outbound cyber-attack, can cause a mitigation strategy to be executed, wherein the mitigation strategy mitigates damage that can be inflicted by the identified cyber-attack. Pursuant to an example, the controller component 242 can identify virtual IP (VIP) addresses of respective services (hosted by the first plurality of servers 204-208) that exhibit anomalous traffic flow patterns (e.g., VIP, wherein the service is hosted by at least one server in the first plurality of servers 204-208). The controller component 242 can then cause a mitigation strategy to be deployed, such as transmitting data to the services respectively represented by the VIP addresses (to allow the services to rate throttle, for instance). In another example, the controller component 242 can cause a computing device having a particular IP address to be blacklisted.

Operation of the shim layer 224 is now described in more detail. As indicated previously, the second plurality of (commodity) servers 212-216 can be configured with the SLBs 218-222, respectively. The second plurality of servers 212-216 also instantiate the distributed shim layer 224. With more particularity, the second plurality of servers 212-216 include the respective monitor components 226-230, which, in an example, can execute in respective VMs instantiated on the second plurality of servers 212-216. The shim layer 224 can be configured to sample data packets at a configurable sample rate, parse a header of each sampled data packet, and (optionally) parse the payload for each sampled data packet. For instance, the shim layer 224 can be configured to sample each data packet. In another exemplary embodiment, the SLBs 218-222 can parse the headers of data packets, and can pass parsed header information to the shim layer 224. The shim layer 224 can generate a (compact) representation of each sampled data packet to track intra-flow features (e.g. number of TCP SYN packets sent in a traffic flow, to detect SYN flood attacks), as well as inter-flow features (e.g., a number of distinct flows to port 1433 to detect attacks that aim to exploit a known vulnerability in one of the host servers 204-208). When the shim layer 224 is configured to parse the payload of data packets, a deep packet inspection (DPI) framework can be used to match the payload against malware signatures or to do postmortem analysis.

As shown, the shim layer 224 can be implemented or deployed in a distributed setup with the commodity servers 212-216, wherein the commodity servers 212-216 are also configured to run software implementations of network functionality, such as the SLBs 218-222. In such an example, for instance, the SLBs 218 can also act as respective multiplexors that fork incoming packets for which it performs VIP to DIP mapping, and can pass the data packets to the shim layer 224 for monitoring and traffic flow tracking. Thus, for example, the monitor component 226 can receive each data packet that is seen by the SLB 218. The monitor components 228 and 230 can act similarly, such that an aggregate view of traffic flows through the data center 100 can be constructed by the controller component 242 in near real-time (e.g., over a variety of time granularities).

As referenced above, it is to be understood that the shim layer 224 can be implemented in other locations in the data center 200. For example, the shim layer 224 may be instantiated in VMs on the first plurality of server computing devices 204-208. In another example, the shim layer 224 can be deployed with existing network gear, such as switches or routers, or a combination.

In still yet another exemplary embodiment, rather than implementing the shim layer 224 as shown in FIG. 2, a scale out layer can be deployed in situ, either statically at ingress/egress of network switches and routers or dynamically when an ongoing network attack is suspected (e.g., by bouncing traffic off VMs running the shim layer 224). In yet another exemplary embodiment, the shim layer can be deployed out-of-band, where traffic is forked by way of port-mirroring at switches and/or routers.

Now referring to FIG. 3, a functional block diagram of an exemplary monitor component 300 (e.g., one of the monitor components 226-230) that can execute in a commodity server (e.g., one of the commodity servers 212-216) is illustrated. For example, the monitor component 300 can execute in a VM instantiated on one of the commodity servers 212-216. The monitor component 300 includes a builder component 302 and a flow feature analyzer component 304. As indicated previously, the monitor component 300 receives a plurality of data packets, which may be portions of pluralities of traffic flows (ingress and/or egress traffic flows). For each data packet received, the builder component 302 can build a representation of the data packet. The representation can be generated using any suitable data structure, such as a sketch (e.g., a count-min sketch, a k-array sketch, a reversible sketch). In another example, the builder component 302 can utilize bitmaps to respectively represent data packets.

The flow feature analyzer component 304 can receive the representations of data packets constructed by the builder component 302, and can generate summaries of traffic flows based upon such representations. The summaries, possibly at multiple time granularities, can be indicative of both inter-flow and intra-flow traffic features, as indicated above. The flow feature analyzer component 304 can update the traffic flow summaries as representations are received from the builder component 302. The flow feature analyzer component 304 can be programmed to push traffic flow summaries to the controller component 242 (e.g., periodically, when a particular event is detected, etc.). In another example, the flow feature analyzer component 304 can transmit traffic flow summaries responsive to receipt of a request from the controller component 242. Responsive to transmitting the traffic flow summaries, the flow feature analyzer component 304 can flush at least portions of the traffic flow summaries, and can construct new summaries based upon data packet representations from the builder component 302. It is to be understood, however, that in some embodiments particular attention may be paid to certain traffic flows, wherein traffic flow summaries are more granularly generated, retained for longer periods of time compared to summaries of other traffic flows, etc. This allows for particular traffic flows to be monitored aggressively to detect attacks.

Now referring to FIG. 4, a functional block diagram of the controller component 242 when the data center architecture 200 includes the shim layer 224 is illustrated. The controller component 242 includes a receiver component 402 that receives traffic flow summaries output by the shim layer 224. As discussed previously, the traffic flow summaries can be indicative of volume of traffic transmitted between a VIP address and an external IP address over a window or windows of time, types of communications transmitted between the VIP address and external IP address (e.g., protocols used to perform the communications), etc. The controller component 242 also includes a traffic analyzer component 404 that identifies an inbound attack and/or and outbound attack based upon the traffic flow summaries. With more particularity, instead of treating each traffic flow in isolation to detect attacks and anomalies, the controller component 242 can represent a scalable attack detection service that is hosted on commodity VMs/servers, which correlates and aggregates the traffic summaries provided by the shim layer 224. The analysis performed by the traffic analyzer component 404 can be performed in three stages: 1) the traffic analyzer component 404 can perform rule checking to match traffic flow metadata (e.g., port, IP address, protocol) against a whitelist (e.g., legitimate customer traffic exhibiting large, bursty traffic) and/or a blacklist (e.g., spammers, list of brokers/facilitators of malicious traffic, etc.). The traffic analyzer component 404 can then cause appropriate action to be taken to block or attenuate traffic flows believed to include respective attacks. Additionally, for each traffic summary received from the shim layer 224 (e.g., via push or pull), the internal flow state can be updated to keep track of potentially malicious traffic flows (e.g., top k VIPs for SYNs, UDP floods, ICMP traffic, and RDP/VNC/SSH connections). The state can be maintained in a distributed manner (e.g., in memory key-value store), co-located with processing elements comprising the shim layer 224, or in combination with the logically central controller component 242. Finally, the traffic analyzer component 404 can use a variety of change detection algorithms (e.g., dynamic time warping, ARMA, EWMA) on the traffic state, for instance, to detect traffic spikes over a period of time. Output of these algorithms is stored in a traffic change estimation table, which can be used to identify anomalous network flows attacking the data center network and/or its hosted tenants.

FIG. 5 is a functional block diagram of, for example, the server computing device 212 shown in FIG. 2. As discussed above, the server computing device 212 includes the SLB 218, which can have a corresponding SLB multiplexor 502. The server computing device 212 can include at least one network interface card 504, which receives data packets from, for example, a switch or router via a communication link. Data packets received by the network interface card 504 are provided to the SLB multiplexor (MUX) 502, which performs a header parse 506. The parsed header can be provided to the monitor component in the shim layer 224 on the server computing device 212 (e.g., the monitor component 226), wherein the shim layer 224 can generate a traffic summary representation 508 for at least one traffic flow. The SLB MUX 502 can further identify a direct IP address from the VIP identified in the data packets (e.g., 510). Block 512 represents the action of the measurement data acquired by the shim layer 224, e.g., periodically, being synchronized with the controller component 242. For instance, the syncing may occur as a push function or in response to receipt of a request from the controller component 242 (as a pull). As indicated in FIG. 5, the SLB MUX 502 and the generation of the traffic summary representation 508 can exist in a the kernel space of one or more VMs instantiated on the server computing device 212. The synchronization 512 can occur in the user space, such that synchronization is programmable.

Figure 6:
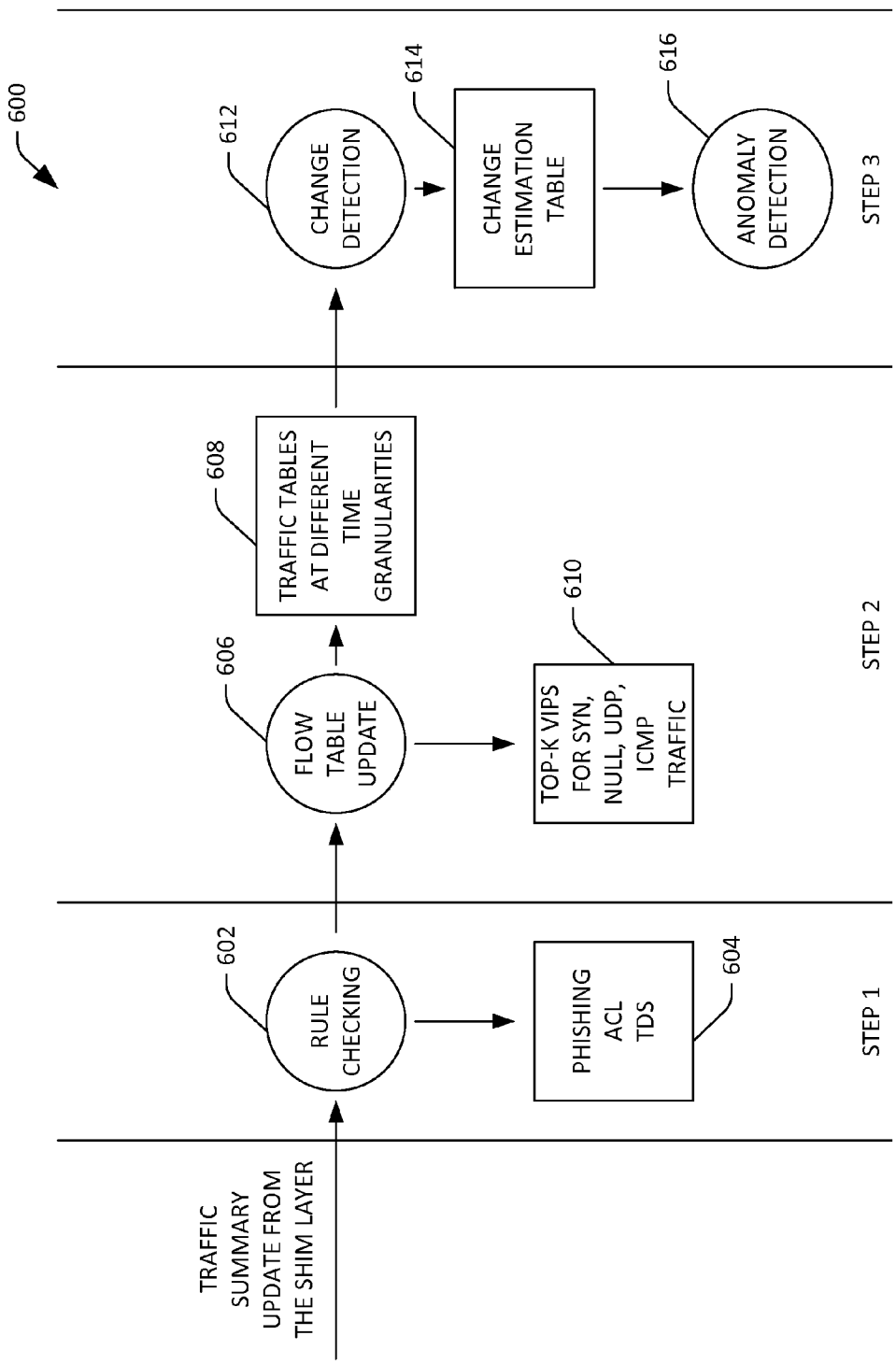
FIG. 6 is a flow diagram that illustrates an analysis that can be performed based upon aggregated summaries of traffic flows through a data center.

FIG. 6 illustrates a flow of actions that can be performed by the controller component 242 when the attack detection system 138 is at least partially implemented by way of the shim layer 224. As shown, initially, the controller component 242 can receive traffic summary updates from the shim layer 224. The controller component 242 then performs a rules check at 602. The rules checking 602 is performed to match flow metadata, such as port IP address, protocol, etc. against a whitelist and/or a blacklist. In an exemplary embodiment, the blacklist can be or include a list of IP addresses that are known to correspond to phishing, an access control list (ACL), or TDS, as shown in block 604. Subsequently, at 606, a flow table is updated. The flow table represents the internal flow state for each traffic summary. This results in generation of traffic tables at different time granularities, as shown at block 608. At block 610, the controller component 242 generates a list of top-k VIPs by "impact", where the impact is indicative of devices and/or services identified by the VIP as being attacked or launching attack. The impact metric can be defined as at least one of the following: 1) number of packets, number of bytes (for DDoS); 2) number of connections possibly with low traffic volume (for port/network scans, worms RDP, brute force attacks); 3) TCP flags (for null scan, RST anomaly); 4) port and traffic volume combination (for DNS redirection, spam); 5) port and number of connections (for malware). The top-k view can be generated through traffic tables at different time granularities. For instance, multiple spatio-temporal granularities can be represented using hierarchical aggregation (e.g., group by/16 subnet and multiple time windows). For instance, the top-k view can be built to indicate the top-k VIP addresses by impact over the last one minute, the top-k VIP addresses by impact over the last five minutes, and the top-k VIP addresses by impact over the last ten minutes. This allows for detection of both instantaneous transient spikes in the last 60 seconds and persistent anomalies which last over time (e.g., based on a time-smoothed estimate of recent traffic). At 612, change detection algorithms can be executed over the traffic tables referenced above. This allows for detection of traffic spikes over a period of time. The output of the change detection algorithms is stored in a traffic change estimation table 614, which can be used identify anomalous network flows (anomaly detection 616) attacking the data center network and/or its hosted tenants.

Turning now to FIG. 7, an exemplary depiction of the attack detection system 138 when implemented as a subsystem in the data center architecture 100 is illustrated. Again, the attack detection system 138 can be at least partially implemented through utilization of a plurality of commodity servers 702-704. Each of the servers 702-704 can have a respective plurality of VMs instantiated thereon. It is to be understood, however, that one or more of the servers 702-704 may have zero VMs instantiated thereon or a single VM instantiated thereon. Thus, in this example, the first server 702 has a first plurality of VMs 706-708 instantiated thereon, and the Nth server has an Nth plurality of VMs 710-712 instantiated thereon. As will be described herein, each VM can have a respective analyzer component executing therein, wherein the analyzer component is configured to passively collect ongoing traffic (e.g., via sampling), analyze the traffic via detection modules, and prevent unauthorized traffic as configured by the controller component 242.

Turning briefly to FIG. 8, a functional block diagram of an analyzer component 800 is illustrated. This diagram is particularly relevant to instantiations when the analyzer component 800 executes directly on a server without virtualization. Aspects described here, however, may also be relevant to a kernel of a guest operation system executing in one of the VMs 706-712. Functionality of the analyzer component 800 can be partitioned between kernel space 802 and user space 804. In the kernel space 802, a sampler 806 can sample data packets forked from traffic flows. The sampling rate can be configured as desired. The sampling is undertaken in the kernel space 802 for purposes of performance and efficiency. A packet buffer 808 buffers sampled data packets, and a de-multiplexer table 810 is used to further multiplex sampled data packets.

The user space 804 includes detector modules, wherein the detector modules can include a heavy hitter detector 812 and a super spreader detector 814. The superstar detector 814 can optionally output data to a deep packet inspection (DPI) module 816.

The role of the analyzer component 800 is to passively collect ongoing traffic, analyze the traffic using the detector modules 812 and 814/816, and prevent unauthorized traffic as configured by the controller component 242. For each instantiation of the analyzer component 800 in the attack detection system 138, the controller component 242 can instantiate the detectors 812 and 814 (e.g., the heavy hitter detector 812 for TCP, SYN/UDP floods, the super spreader detector 814 for DNS reflection), attach the sampler 806 (e.g., flow-based, packet-based, sample, and hold), and set its configurable sampling rate, provide a callback URI, and then install the analyzer component 800 on the appropriate VM.

When one of the detector modules detects an ongoing attack, the detector module invokes a callback to the provided URI. The callback then decides to specify a mitigation strategy in an application-specific manner. For instance, it can set up rules for access control, rate limit, or redirect anomalous traffic to scrubber devices for an in-depth analysis. Setting up mitigator instances is similar to that of detectors—the application specifies a mitigator action (e.g. redirect, scrub, mirror, allow, deny), and specifies the flow (either through a standard 5-tuple or <VIP, protocol/port> pair) along with a callback URI.

The separation of functionality between the kernel space 802 and the user space 804 allows for multistage attack detection and mitigation (e.g., traffic from source IPs sending a TCP SYN attack can be forwarded to the DIP module 816 for deep packet inspection). The intuition behind co-locating detectors and mitigators on the same VM instance is that it reduces the critical overheads of traffic redirection, which can be significant, and leverages the caches to store the packet content. Further, this approach avoids controller overheads of managing different types of instances of the analyzer component.

Given limited computing and memory capacity in VM instances, a key question is what granularity key used to identify and specify actions on anomalous flows. While using the 5-tuple flow identifier allows flexibility to specify detection and mitigation at a defined granularity, using such identifier risks high resource overheads, missing attacks at the aggregate level (e.g. VIP), or treating correlated attacks as independent ones. In conventional cloud scenarios, since traffic flows can be logically partitioned by VIPs, traffic flows can be addressed using the <VIP, protocol> pairs. This allows for state for a large number of flows to be efficiently managed at each instance of the analyzer component 800, and further customized attack detection solutions can be designed for VIPs.

Returning to FIG. 7, the controller component 242, in such an architecture, collects the load information across instances of the analyzer component 800 for every defined measurement interval. If needed, the controller component 242 computes a new allocation of traffic distribution across existing VMs, and can scale out/in VM instances depending upon the loads. In another example, the controller component 242 can allocate additional resources to a VM or de-allocate resources from a VM based upon the loads. Finally, the controller component 242 can install routing rules to redirect traffic.

The controller component 242 includes the receiver component 402 and the traffic analyzer component 404, which can act as described above. The controller component 242 can also include a scaler component 714 that can be used to scale in/out VMs, or provide VMs with additional resources or remove resources from the VMs. For instance, in the cloud environment, traffic patterns destined to an instance of the analyzer component 800 may quickly increase due to higher traffic rate of existing flows (e.g., volume-based attacks) or setup of new flows (e.g., due to tenant deployment). Therefore, it is desirable to avoid overload of instances of the analyzer component 800, as overloading can risk accuracy and effectiveness of attack detection and mitigation. To address this issue, the controller component 242 (e.g., the scaler component 714) can monitor load at each instance of the analyzer component 800 and can dynamically reallocate traffic across existing and possibly newly instantiated VMs. When implementing this functionality, a metric used to measure the load can be selected, a mechanism or process to redistribute traffic across instances is selected, and decisions about transfer of flow state from an overloaded instance to a new/existing one, are determined.

In an exemplary embodiment, CPU can be chosen as the VM load metric, as CPU utilization may strongly be tied or correlated to traffic rate. CPU usage can be modeled as a function of the traffic volume for different anomaly detection/mitigation algorithms to set the maximum and minimum load threshold.

To redistribute traffic, a bin packing problem can be formulated which takes the top-k<VIP, protocol> pairs by traffic rate as input from the overloaded VMs, and uses the first fit decreasing algorithm that allocates traffic to the other VMs while minimizing the migrated traffic. If the problem is infeasible, a new analyzer component instance can be allocated so that no single instance is overloaded. For scale-in, all VMs whose load falls below the minimum threshold become candidates for standby or being shut down. VMs selected to be taken out of operation stop accepting new flows and transition to inactive state once incoming traffic ceases. It can be noted that other traffic redistribution and auto-scaling approaches can be applied.

Finally, many attack detection/mitigation tasks are state independent. For example, to detect the heavy hitters of traffic to a VIP, traffic volumes only in the most recent intervals need be tracked. This simplifies traffic redistribution, as potentially large measurement state of transition flows need not be transferred. For those measurement tasks that do need transition states, a constraint for the traffic distribution algorithm can be added to avoid moving their traffic.

To redistribute traffic, the controller component 242 can change routing entries at the upstream switches and/or routers to redirect traffic. To quickly transition the service to a stable state during churn, the controller component 242 can maintain a standby resource pool of VMs which are in active mode and can take the load immediately.

Figure 9:
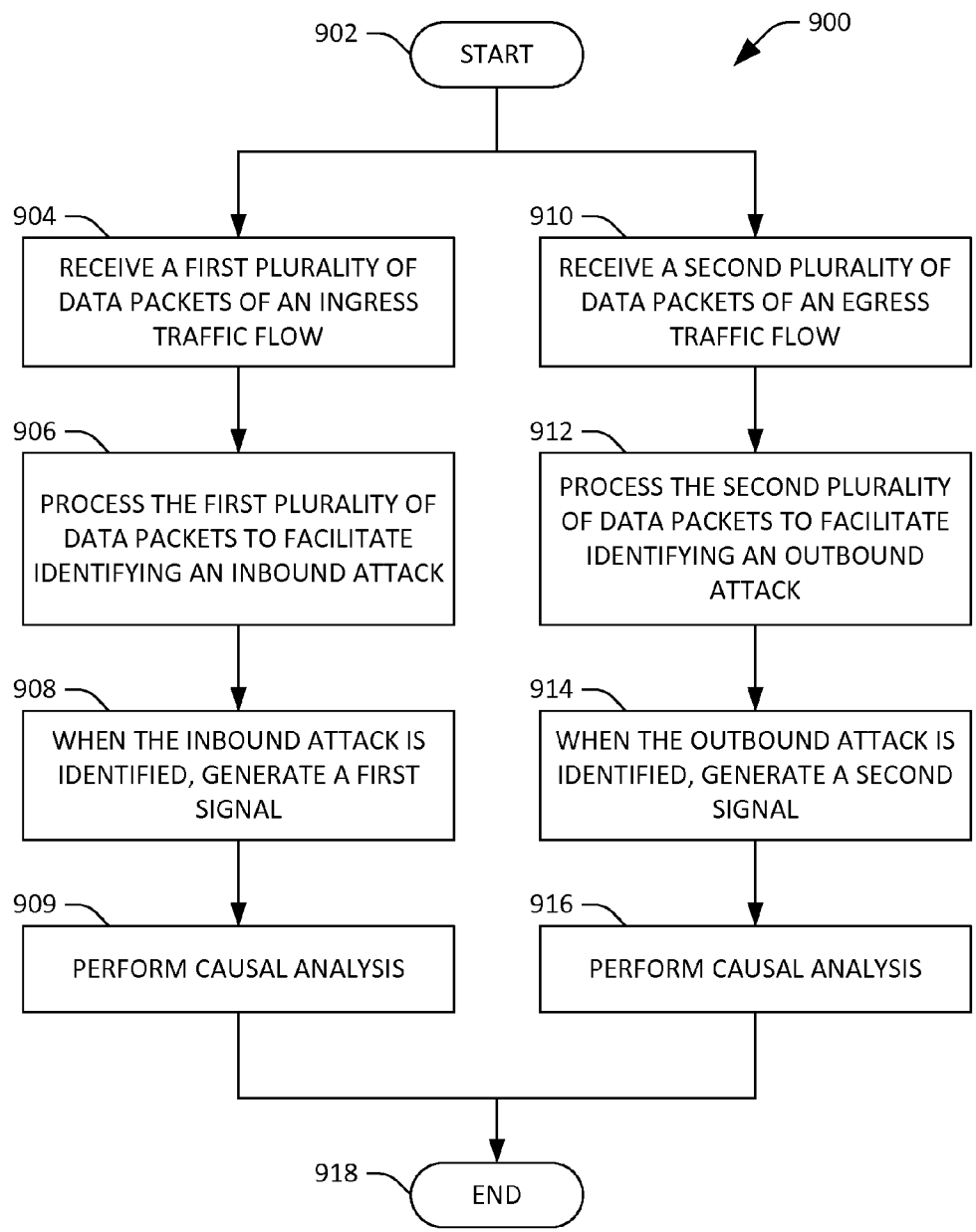
FIG. 9 is a flow diagram that illustrates an exemplary methodology for detecting inbound and outbound attacks through utilization of commodity servers in a data center.
Figure 10:
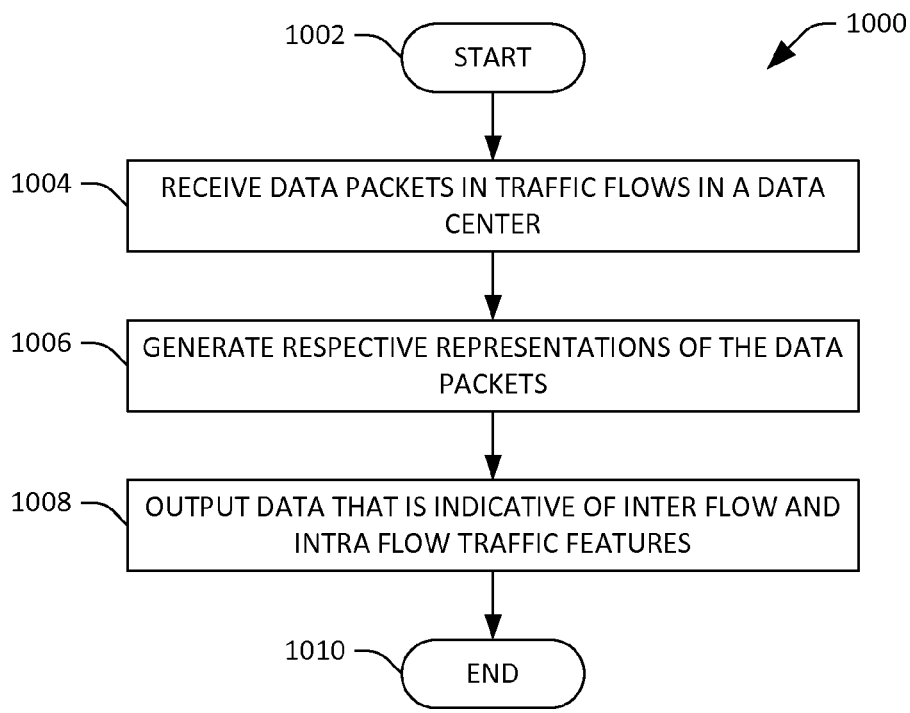
FIG. 10 is a flow diagram that illustrates an exemplary methodology for identifying an inbound or outbound attack in a data center.
Figure 11:
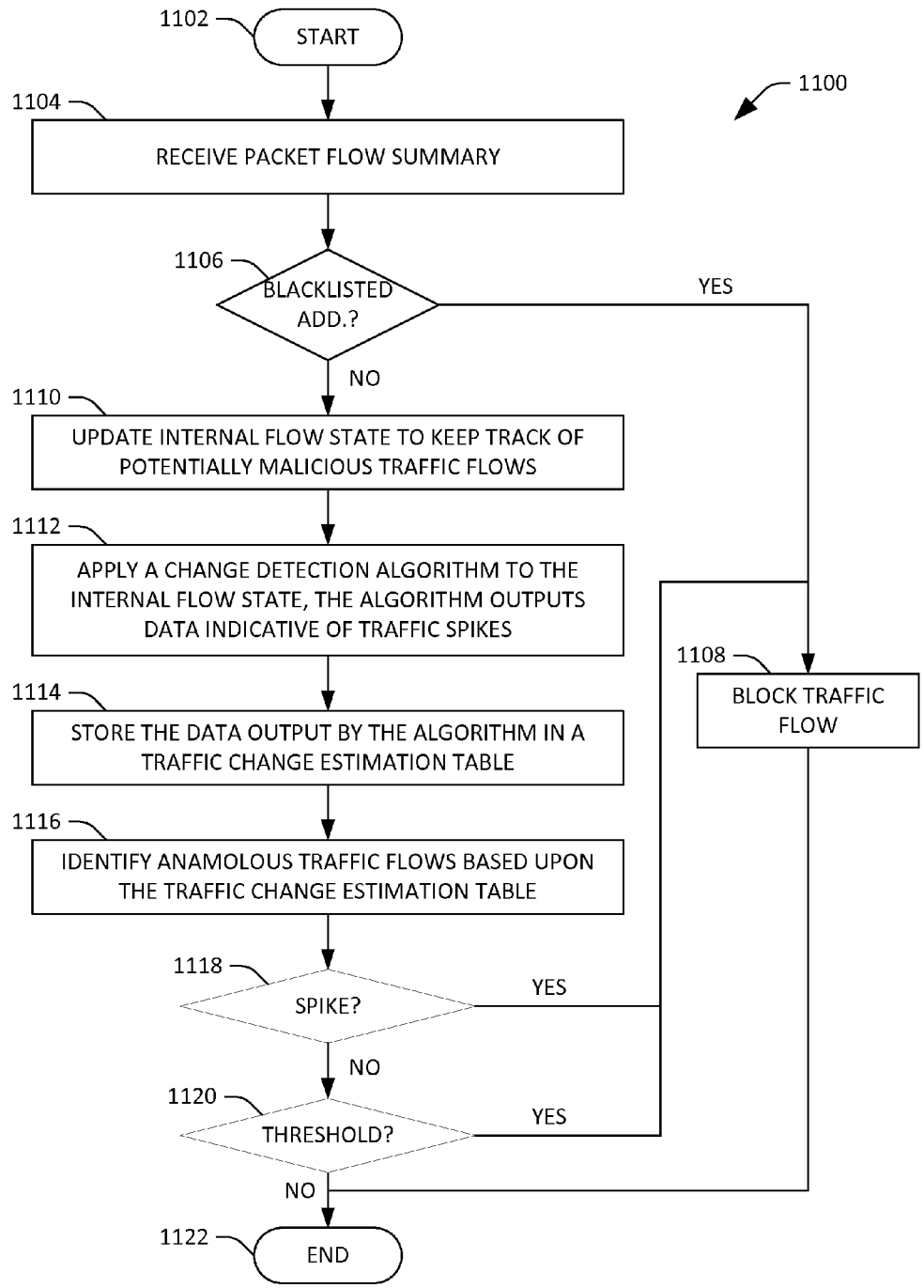
FIG. 11 is a flow diagram that illustrates an exemplary methodology for identifying attacks of different types on the data center.

FIGS. 9-11 illustrate exemplary methodologies relating to detecting anomalies and/or attacks in a data center. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 9, an exemplary methodology 900 that facilitates detecting inbound and outbound attacks in a data center is illustrated. The methodology 900 starts 902, and at 904, a first plurality of data packets of an ingress traffic flow is received, wherein the ingress traffic flow is transmitted to a first computing device in a data center or a first service hosted by the data center. The ingress traffic flow can be transmitted from a second computing device or a second service. The second computing device or second service can be internal to the data center or external to the data center. At 906, responsive to receiving the first plurality of data packets, the first plurality of data packets are processed to facilitate identifying an inbound attack, wherein the inbound attack is an attack on the first computing device or first service from the second computing device or second service. At 908, when the inbound attack is identified, a first signal is generated that indicates that the inbound attack has been identified. In an exemplary embodiment, the inbound attack may be caused by an outbound attack. Thus, the methodology 900 is intended to cover both 1) concurrent analysis of ingress and egress flows to identify inbound and outbound attacks; and 2) causal relationships between an inbound attack and an outbound attack. For instance, a VM in the data center can participate in an outbound attack, and the target may retaliate with an inbound attack. Thus, a causal analysis can optionally be performed at 909, wherein the causal analysis can include searching for an identifying a cause of the inbound attack.

At 910, a second plurality of data packets of an egress traffic flow is received, wherein the egress traffic flow is transmitted from a third computing device in the data center or a third service hosted by the data center to a fourth computing device that is external to the data center. At 912, responsive to receiving the second plurality of data packets, the second plurality of data packets are processed to facilitate identifying an outbound attack, the outbound attack being an attack on the fourth computing device from the third computing device or third service. At 914, when the outbound attack is identified, a second signal is generated that indicates that the outbound attack has been identified.

In an exemplary embodiment, the outbound attack may be caused by the inbound attack. For instance, the inbound attack may compromise a vulnerable target. The inbound attack may be identified, but mitigating actions may fail to prevent the vulnerable target from being "taken over." The outbound attack may then be generated by the vulnerable target, and the outbound attack can be detected. Accordingly, optionally, at 916, a causal analysis can be performed, where a cause of the outbound attack can be searched for (and identified). The methodology 900 completes 918.

With reference now to FIG. 10, an exemplary methodology 1000 that facilitates utilization of an in-band shim layer to detect attacks on a data center is illustrated. The methodology 1000 starts at 1002, and at 1004, data packets in traffic flows are received in the data center. The source and/or destination address may be, for example, a VIP address. At 1006, respective representations of the data packets are generated. The representations can be constructed by parsing the header and/or (optionally payload) of data packets received at 1004. At 1008, data is output that is indicative of inter-flow and intra-flow traffic features. This data can be referred to as traffic flow summaries which may be indicative of volume of data packets in a traffic flow over a range of time granularities. The methodology 1000 completes at 1010.

Now referring to FIG. 11, an exemplary methodology 1100 for processing traffic flow summaries to identify cyber-attacks on a data center is illustrated. The methodology 1100 starts at 1102, and at 1104, traffic flow summaries are received. At 1106, a determination is made regarding whether the traffic flow represented by the traffic flow summary is to or from a blacklisted site. For example, a source and/or destination address corresponding to the traffic flow can be compared to a list of blacklisted. If it is determined at 1106 that the traffic flow corresponds to a blacklisted address, then at 1108, traffic can be blocked to or from such address. If it is determined at 1106 that the traffic does not correspond to a blacklisted address, then the methodology 1100 proceeds to 1110, where an internal flow state is updated to keep track of potentially malicious traffic flows. At 1112, a change detection algorithm is applied to the internal flow state, where the algorithm outputs data indicative of traffic spikes over different time granularities. At 1114, the data output by the algorithm is stored in a traffic change estimation table, and at 1116, anomalous traffic flows are identified based upon the traffic change estimation table. For anomalous traffic flows, a mitigation step can be performed including rate limiting, traffic flows, blocking traffic, etc. In an example, as illustrated in FIG. 11, at 1118 if a spike is identified in the data output by the algorithm, then an alarm can be generated and the methodology 1100 can proceed to 1108, where the traffic flow is blocked. Similarly, at 1120 if it is determined that volume of a traffic flow or flows exceeds a predefined threshold (even if not exhibiting spike characteristics), then an alarm can be generated and the methodology 1100 can proceed to 1108, where the traffic flow is blocked. Other mitigation actions are also contemplated. The methodology 1100 completes at 1122.

Various examples are now set forth.

Example 1

A method executed by at least one computing device in a data center, the at least one computing device configured to form at least a portion of a shim layer in the data center, the shim layer instantiated by way of a plurality of server computing devices, the method comprising: receiving, at the at least one computing device in the shim layer, a plurality of data packets of a traffic flow, the traffic flow transmitted between: a first computing device in the data center or a first service hosted by the data center; and a second computing device or a second service; responsive to receiving the plurality of data packets, processing the plurality of data packets to facilitate identifying an attack; and when the attack is identified, generating a signal that indicates that the attack has been identified.

Example 2

A method according to example 1, the shim layer positioned in-band as the traffic flow traverses through the data center.

Example 3

A method according to any of examples 1 or 2, wherein the plurality of server computing devices are also configured to execute respective software load balancers.

Example 4

A method according to any of examples 1-3, wherein the plurality of server computing devices have respective virtual machines instantiated thereon, and wherein at least one virtual machine instantiated on the at least one computing device performs the acts of receiving, processing, and generating.

Example 5

A method according to any of examples 1-4, wherein the processing of the plurality of data packets comprises: generating respective representations of the plurality of data packets; and generating a first traffic summary based upon the first plurality of data packets, the first traffic summary being indicative of at least one inter-flow or intra-flow traffic feature corresponding to the traffic flow.

Example 6

A method according to example 5, wherein the processing of the plurality of data packets further comprises at least one of: receiving first traffic summaries of a plurality of ingress traffic flows, respectively; aggregating the first traffic summaries; and identifying an inbound attack based upon the aggregating of the first traffic summaries; or receiving second traffic summaries of a plurality of egress traffic flows, respectively; aggregating the second traffic summaries; and identifying an outbound attack based upon the aggregating of the second traffic summaries.

Example 7

A method according to example 6, wherein the plurality of data packets comprise respective headers that include data that is indicative of an identity of the second computing device, wherein identifying the inbound attack or the outbound attack comprises: comparing the identity of the second computing device with a blacklist that identifies computing devices known to participate in attacks; and determining that the second computing device is included in the blacklist; and responsive to determining that the second computing device is included in the blacklist, blocking data in a traffic flow that is from or to the second computing device.

Example 8

A method according to example 6, wherein identifying the attack further comprises: identifying the first service, the first service is to receive an ingress traffic flow; responsive to identifying the first service, determining a volume of traffic directed to the first service by the second computing device over a window of time; and identifying the attack based at least in part upon the volume of traffic directed to the first service by the second computing device over the window of time.

Example 9

A method according to any of examples 1-8, further comprising: prior to receiving the plurality of data packets of the traffic flow, receiving an instruction from a third computing device that is external to the shim layer, the instruction causes the at least one computing device to one of: instantiate or deinstantiate a virtual machine thereon, wherein the acts of receiving, processing, and generating are performed in the virtual machine; allocate additional resources to the virtual machine; or de-allocate resources from the virtual machine.

Example 10

A method according to any of examples 1-9, wherein the receiving of the plurality of data packets occurs at a virtual machine executing on the at least one computing device, the virtual machine configured to sample the plurality of data packets from the traffic flow at a first configurable sampling rate.

Example 11

A method according to any of examples 1-10, further comprising: identifying the attack based upon the processing, wherein identifying the attack comprises identifying a type of the attack from amongst a plurality of possible attack types; and executing a mitigation strategy based at least in part upon the identifying of the type of the attack.

Example 12

A system that is configured to detect attacks with respect to a data center, the system comprising: at least one processor; and at least one memory that comprises an attack detection system that is executed by the at least one processor, the attack detection system comprises a control component, the control component comprises: a receiver component that receives traffic flow data, the traffic flow data indicative of a feature of traffic transmitted between: a first computing device in the data center or a first service hosted by the data center; and a second computing device or a second service over a window of time; and a traffic analyzer component that identifies either an inbound attack or an outbound attack based upon the traffic flow data, the inbound attack being an attack on the first computing device or first service from the second computing device or the second service, the outbound attack being an attack on the second computing device or second service from the first computing device or first service.

Example 13

A system according to example 12, the inbound attack or the outbound attack being an intra-data center attack.

Example 14

A system according to any of examples 12-13, further comprising: a shim layer situated between an edge router of the data center and a host server of the data center in a data center architecture, the shim layer transmits the traffic flow data to the controller component.

Example 15

A system according to example 14, the shim layer distributed over a plurality of servers in the data center.

Example 16

A system according to example 15, the plurality of servers additionally configured to execute a respective plurality of software load balancers, the software load balancers configured to direct traffic across a plurality of network infrastructure devices based upon respective flow traffic volumes flowing through the software load balancers.

Example 17

A system according to any of examples 14-16, wherein the shim layer comprises: a builder component that receives a plurality of data packets in a traffic flow between the first computing device or first service and the second computing device or second service, the builder component generates respective representations of the plurality of data packets; and a flow feature analyzer component that receives the respective representations of the plurality of data packets, the flow feature analyzer component computes the traffic flow data based upon the respective representations of the plurality of data packets.

Example 18

A system according to any of examples 12-17, further comprising: at least one computing device that executes a virtual machine, the virtual machine configured to sample a traffic flow between the first computing device or first service and the second computing device or second service, the virtual machine further configured to transmit the traffic flow data to the controller component based upon the sampled traffic flow.

Example 19

A system according to example 18, the controller component further comprises an auto-scaler component that receives the traffic flow data and performs at least one of the following acts responsive to receiving the traffic flow data: updates traffic route that is directed to the virtual machine based upon the traffic flow data; allocates additional computing resources to the virtual machine based upon the traffic flow data; de-allocates computing resource from the virtual machine based upon the traffic flow data; instantiates a new virtual machine based upon the traffic flow data; or shuts down the virtual machine.

Example 20

A server computing device in a data center, the server computing device executes a software load balancer, the server computing device further configured to perform a plurality of acts, comprising: receiving a traffic flow between at least one computing device in a data center and a computing device that is external to the data center, the traffic flow comprises a plurality of data packets; responsive to receiving the traffic flow, generating respective representations of the plurality of data packets; responsive to generating the respective representations of the plurality of data packets, computing a traffic flow summary for the traffic flow, the traffic flow summary indicative of at least one feature of the traffic flow; aggregating multiple traffic flow summaries to construct a traffic flow table; determining that the traffic flow includes an attack, the attack being one of an inbound or outbound attack; determining a type of the attack; and executing a mitigation policy responsive to determining the type of the attack.

Figure 12:
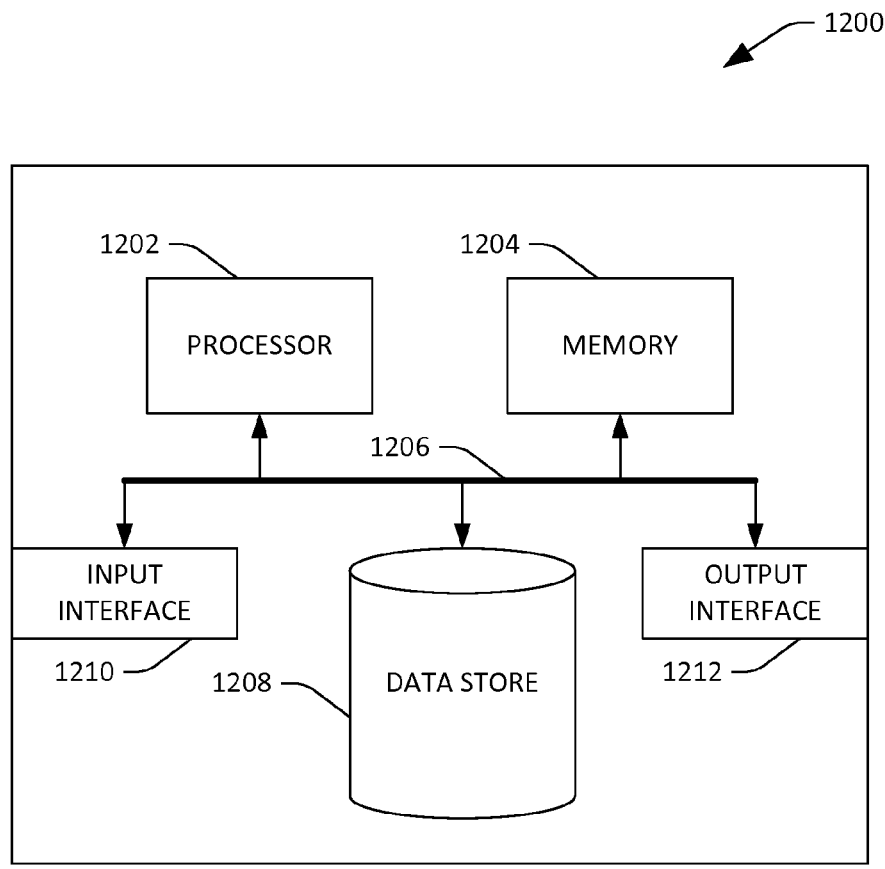
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that supports instantiation of a shim layer in a data center. By way of another example, the computing device 1200 can be used in a system that supports instantiation of a subsystem that is configured to detect attacks or anomalies. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store traffic summaries, packet representations, etc.

The computing device 1200 additionally includes a data store 1208 that is accessible by the processor 1202 by way of the system bus 1206. The data store 1208 may include executable instructions, traffic summaries, traffic representations, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method comprising:
at a computing device in a data center:
receiving traffic flow summaries from virtual machines (VMs) executing on server computing devices in the data center, wherein the server computing devices are positioned in the data center to receive traffic transmitted from host computing devices in the data center and traffic transmitted to the host computing devices in the data center, the host computing devices configured to execute workloads of clients of the data center, wherein a traffic flow summary in the traffic flow summaries is generated by a VM based upon a traffic flow transmitted between:
a host computing device in the data center; and
a first server computing device;
responsive to receiving the traffic flow summaries and based upon the traffic flow summaries, identifying an attack in the data center;
when the attack is identified, generating a signal that indicates that the attack has been identified; and
based upon the traffic flow summaries, causing at least one VM to be newly instantiated on a second server computing device in the server computing devices, wherein the VM is configured to generate at least one traffic flow summary based upon data packets received by the VM.

2. The method of claim 1, the server computing devices positioned in-band, such that the server computing devices receive the traffic as the traffic traverses through the data center.

3. The method of claim 2, wherein each server computing device in the server computing devices is also configured to execute a software load balancer (SLB), and further wherein a third server computing device in the server computing devices generates the traffic flow summary based upon data packets directed to the host computing device by the SLB.

4. The method of claim 2, wherein each server computing device in the server computing devices has at least one VM instantiated thereon, and wherein the computing device is further configured to allocate resources to the VM based upon the traffic flow summary generated by the VM.

5. The method of claim 1, wherein the traffic flow summary is indicative of at least one inter-flow or intra-flow traffic feature corresponding to the traffic flow.

6. The method of claim 5, wherein identifying the attack in the data center comprises at least one of:
receiving first traffic flow summaries of a plurality of ingress traffic flows, wherein ingress traffic flows are traffic flows transmitted to at least one host computing device in the host computing devices;
aggregating the first traffic flow summaries; and
identifying an inbound attack based upon the aggregating of the first traffic flow summaries, the inbound attack being an attack on the at least one host computing device; or
receiving second traffic flow summaries of a plurality of egress traffic flows, wherein egress traffic flows are traffic flows transmitted from at least one host computing device in the host computing devices;
aggregating the second traffic flow summaries; and
identifying an outbound attack based upon the aggregating of the second traffic flow summaries, the outbound attack being an attack from the at least one host computing device.

7. The method of claim 6, wherein the traffic flow summary identifies the first server computing device, wherein identifying the inbound attack or the outbound attack comprises:
comparing the identity of the first server computing device with a blacklist that identifies computing devices known to participate in attacks; and
determining that the first server computing device is included in the blacklist; and
wherein the method further comprises:

responsive to determining that the first computing device is included in the blacklist, blocking data in the traffic flow that is from or to the first server computing device.

8. The method of claim 6, wherein identifying the attack further comprises:
identifying the host computing device, the host computing device is to receive an ingress traffic flow;
responsive to identifying the host computing device, determining a volume of traffic directed to the host computing device by the first server computing device over a window of time; and
identifying the attack based at least in part upon the volume of traffic directed to the host computing device by the first server computing device over the window of time.

9. The method of claim 1, wherein causing at least one VM to be newly instantiated on a second server computing device in the server computing devices comprises:
transmitting an instruction to the second server computing device, wherein the second server computing device instantiates the at least on VM in response to receipt of the instruction.

10. The method of claim 1, further comprising:
at the second server computing device, and subsequent to the VM being instantiated thereon:
sampling a plurality of data packets from a new traffic flow at a configurable sampling rate; and
generating a new traffic flow summary for the new traffic flow based upon the plurality of sampled data packets.

11. The method of claim 1, wherein identifying the attack comprises identifying a type of the attack from amongst a plurality of possible attack types; and
executing a mitigation strategy based at least in part upon the identifying of the type of the attack.

12. A data center, comprising:
a first plurality of server computing devices that are configured to execute computing workloads of clients of the data center;
a second plurality of server computing devices that are in network communication with the first plurality of server computing devices, each server computing device in the second plurality of server computing devices comprises:
at least one processor; and
memory that has loaded therein:
a software load balancer (SLB); and
a virtual machine (VM) that executes a monitor component, wherein the monitor component, when executed by the at least one processor, causes the at least one processor to perform acts comprising:
generating representations of data packets output by the SLB; and
generating a traffic flow summary based upon the representations of the data packets, wherein the traffic flow summary is indicative of a feature of traffic transmitted between:
a first server computing device in the first plurality of server computing devices; and
a second server computing device over a window of time; and
output the traffic flow summary; and
a controller server computing device that is in network communication with the second plurality of server computing devices, wherein the controller server computing device is configured to perform acts comprising:
receiving traffic flow summaries from the monitor components executing in the VMs; and
identifying either an inbound attack or an outbound attack based upon the traffic flow summaries, the inbound attack being an attack on the first computing device from the second computing device, the outbound attack being an attack on the second server computing device from the first server computing device.

13. The data center of claim 12, the inbound attack or the outbound attack being an intra-data center attack.

14. The data center of claim 12, further comprising:
a core router, wherein traffic directed from the core router to the first server computing device passes through one of the server computing devices in the second plurality of server computing devices prior to reaching the first server computing device.

15. The data center of claim 12, the SLBs configured to direct traffic across a plurality of network infrastructure devices based upon traffic flow volumes flowing through the SLBs.

16. The data center of claim 12, wherein the monitor component, when executed by the server computing device in the second plurality of server computing devices, is further configured to:
sample traffic output by the SLB at a configured sampling rate to acquire the data packets output by the SLB.

17. The data center of claim 16, wherein the controller server computing device is further configured to perform acts comprising:
responsive to receiving the traffic flow summaries, performing at least one of the following acts:
allocating additional computing resources to the VM based upon the traffic flow summary;
de-allocating computing resources from the VM based upon the traffic flow summary;
instantiating a new VM based upon the traffic flow summary; or
shutting down the VM.

18. A server computing device in a data center, the server computing device comprises:
at least one processor; and
memory storing instructions that, when executed by the at least one processor, cause the at least one processor to perform acts comprising:
receiving traffic flow summaries from virtual machines (VMs) executing on server computing devices in the data center, wherein the server computing devices are positioned in the data center to receive traffic transmitted from host computing devices in the data center and traffic transmitted to the host computing devices in the data center, the host computing devices configured to execute workloads of clients of the data center, wherein a traffic flow summary in the traffic flow summaries is generated by a VM based upon a traffic flow transmitted between:
a host computing device in the data center; and
a first server computing device;
responsive to receiving the traffic flow summaries and based upon the traffic flow summaries, identifying an attack in the data center;
when the attack is identified, generating a signal that indicates that the attack has been identified; and
based upon the traffic flow summaries, causing at least one VM to be newly instantiated on a second server computing device in the server computing devices, wherein the VM is configured to generate at least one traffic flow summary based upon data packets received by the VM.

19. The server computing device of claim 18, wherein the server computing devices are positioned in-band, such that the server computing devices receive the traffic as the traffic traverses through the data center.

20. The server computing device of claim 19, wherein each server computing device in the server computing devices is also configured to execute a software load balancer (SLB), and further wherein a third server computing device in the server computing devices generates a traffic flow summary based upon data packets directed to the host computing device by the SLB.

* * * * *